United States Patent
Kuo (10) Patent No.: US 7,310,134 B2
(45) Date of Patent: Dec. 18, 2007

(54) DEVICE AND METHOD OF OPTICAL FIBER CONDITION MONITORING IN OPTICAL NETWORKS

(75) Inventor: I-Yu Kuo, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 11/204,996

(22) Filed: Aug. 17, 2005

(65) Prior Publication Data

US 2006/0164628 A1 Jul. 27, 2006

(30) Foreign Application Priority Data

Jan. 26, 2005 (TW) ............... 94102328 A (51) Int. Cl.
*G01N 21/00* (2006.01)
(52) U.S. Cl. .................................. 356/73.1
(58) Field of Classification Search ............ None
See application file for complete search history.

(56) References Cited

U.S. PATENT DOCUMENTS 5,187,362 A 2/1993 Keeble
6,614,515 B2* 9/2003 Fayer et al. ............... 356/73.1
6,771,358 B1* 8/2004 Shigehara et al. ......... 356/73.1

OTHER PUBLICATIONS

Kuniaki Tanaka, et al., "In-service Individual Line Monitoring and a Method for compensating for the Temperature-dependent Channel Drift of a WDM-PON Containing an AWGR Using a 1.6 μm Tunable OTDR", ECOC 97, Sep. 22-25, 1997, Conference Publication No. 448.
The Office Action issued by Japan Patent and Trademark Office on Jul. 18, 2007.

* cited by examiner

*Primary Examiner*—Tu T. Nguyen
(74) *Attorney, Agent, or Firm*—Harness, Dickey & Pierce, P.L.C.

(57) ABSTRACT

A device and method of optical fiber condition monitoring in optical networks is described. The front end of each branch of the optical network is installed with an optical filter that can filter an optical signal with a different wavelength. Optical signals of different wavelengths enter each of the branches in sequence for analysis, so that the condition of each branch on the optical network can be determined. This solves the problem of interference among the branches when monitoring the optical fiber condition on an optical network.

11 Claims, 8 Drawing Sheets

DEVICE AND METHOD OF OPTICAL FIBER CONDITION MONITORING IN OPTICAL NETWORKS

BACKGROUND OF THE INVENTION

1. Field of Invention

The invention relates to an optical network and, in particular, to a device and method that can determine the conditions of individual optical branches in optical networks.

2. Related Art

Currently, the passive optical network (PON) undoubtedly is the hottest technique for the optical access network. However, the optical fiber monitoring technology is still limited. The current solution of using an optical time-domain reflectometry (OTDR) results in the problem that individual branches are hard to distinguish. In particular, the discrimination of branches of similar lengths is restricted by the OTDR dead zone. This is because that the light pulse for detection can enter each branch of the optical fiber. Likewise, the optical waves reflected from each optical path are received by the OTDR. Therefore, the reflected light in different branches but with the same distance from the OTDR will contribute to the optical receiver of OTDR, thus accumulating on the OTDR trace. In this case, when one optical path has an event occurring, especially when two paths are close in length, then the conventional monitoring technology cannot determine in which branch the event is occurring.

Figure 1:
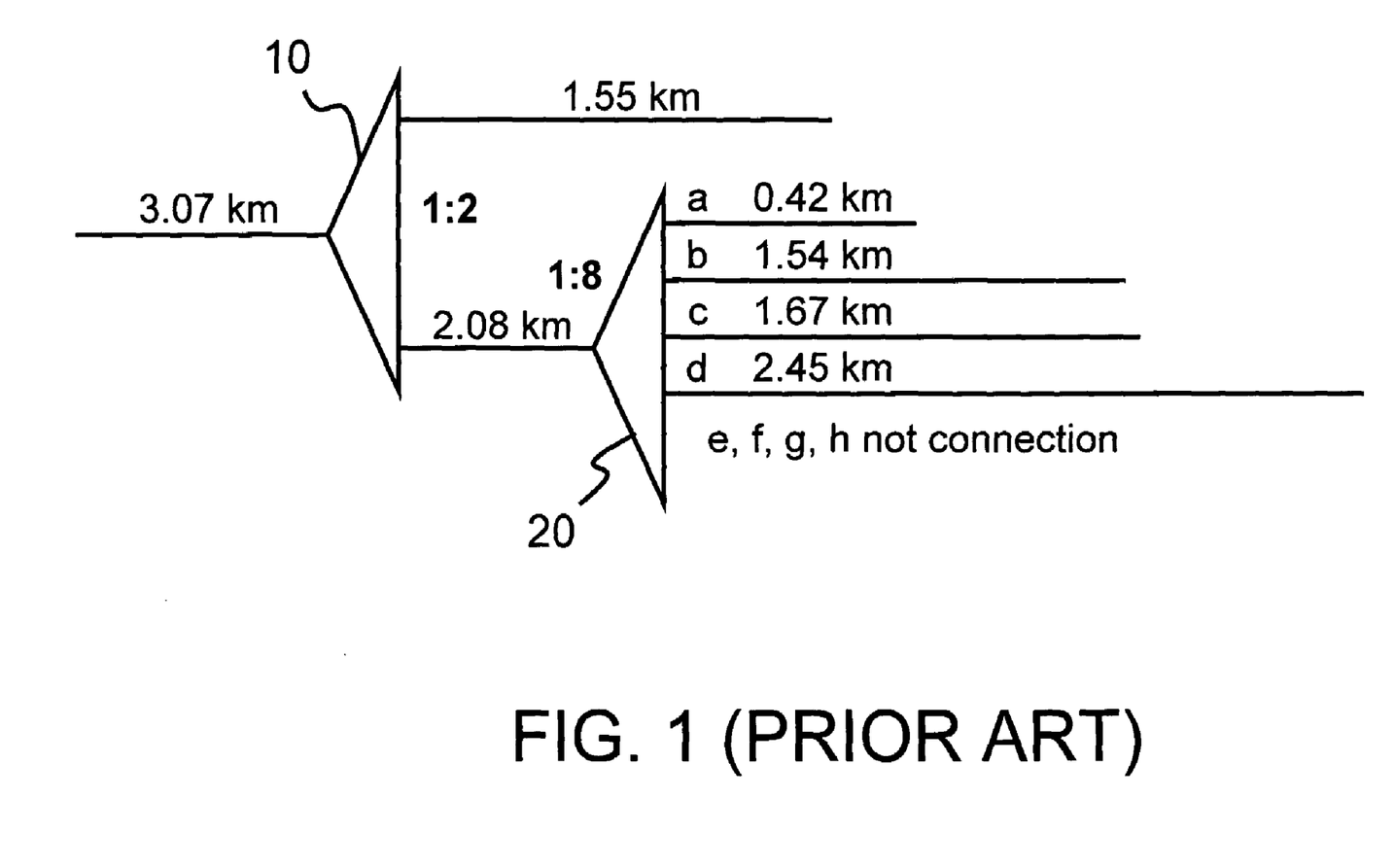
FIG. 1 shows the structure of an optical network with multiple branches.
Figure 2:
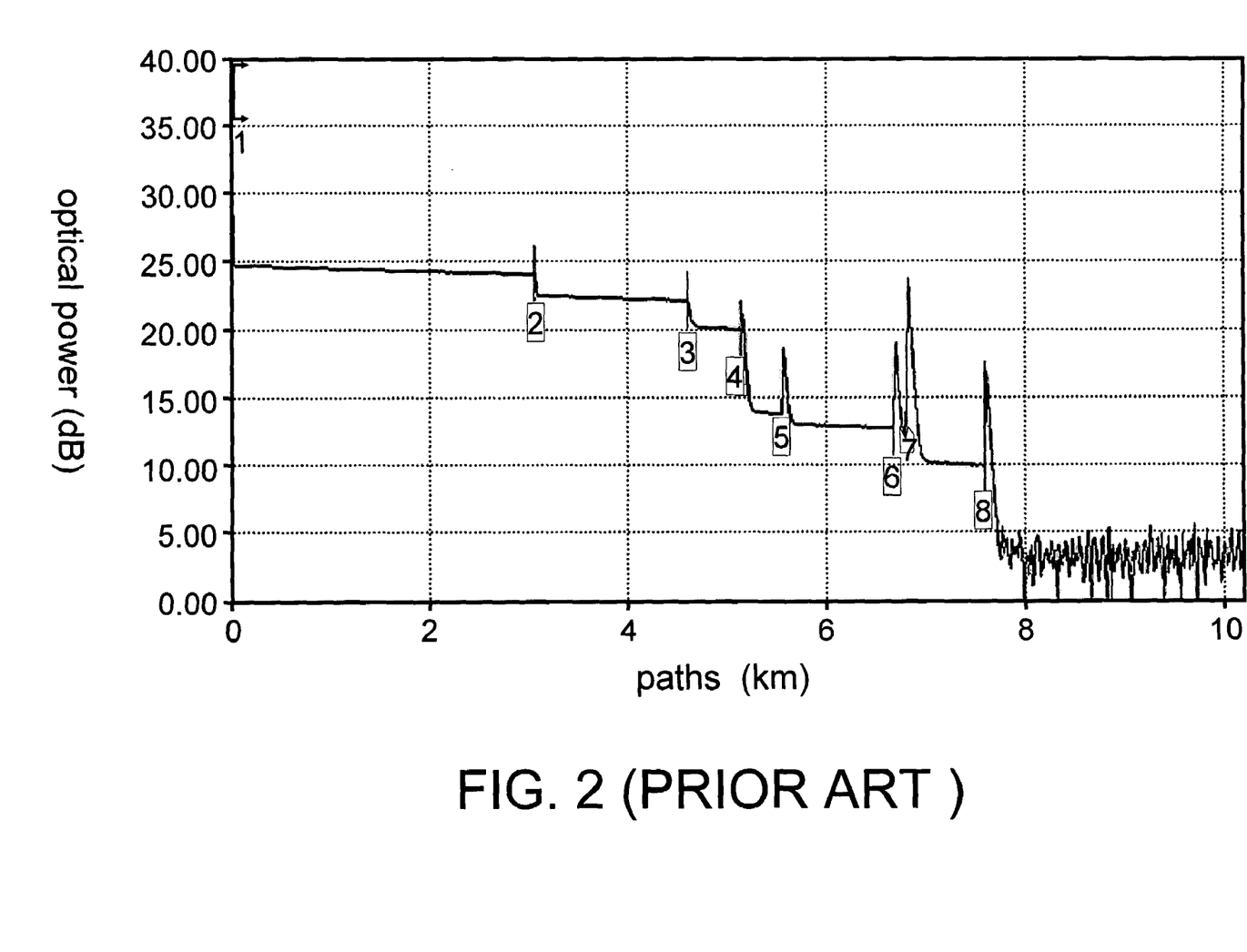
FIG. 2 shows the output paths of OTDR measurement in the prior art.

As shown in FIG. 1, a 1:2 splitter 10 is used at a distance of 3.07 km from the front end in an optical network structure with multiple branches, similar to the passive optical network. A 1:8 splitter 20 is further used at a distance of 2.08 km from the previous splitter. The output terminals a through d are coupled to the splitters at 0.42 km, 1.54 km, 1.67 km, and 2.45 km. The output terminals e to h are not connected. The front end of the network employs a conventional OTDR to measure the optical fiber condition of the network, as shown in FIG. 2, showing the path diagram of the OTDR output. Path 2 shows the attenuation of the 1:2 splitter 10. Path 4 shows the attenuation of the 1:8 splitter 20. The output terminal a to the tail of d also show the paths 5, 6, 7, and 8 in the OTDR trace. All the branch conditions are accumulated onto the same path diagram. Although the conditions on the optical network can be displayed, if one of the branches has a problem it can be discovered by comparing with the original trace with no problem conventionally. This is because at the problem point, the trace after the position is changed. The change stops at the end of the branch with a problem. This is the conventional optical fiber condition monitoring method, as disclosed in U.S. Pat. No. 5,187,362.

However, on these two optical paths of similar lengths, such as paths 6 and 7, it is difficult to distinguish them due to the limitation of the OTDR dead zone. If the length of the optical path increases, an OTDR signal with a longer pulse has to be used to detect. In this case, the dead zone also increases so that one is unable to distinguish the 1.54 km and 1.67 km paths. When an even happens in one of them, it is impossible for find what in which path it is using the conventional monitoring method. In addition, the reflected light from all paths overlap and present on the same OTDR trace if the conventional monitoring method is used. Therefore, one cannot detect the optical fiber properties (e.g., transmission attenuation) of individual paths. It is thus imperative to develop a new monitoring technique to solve the discrimination problem.

SUMMARY OF THE INVENTION

In view of the foregoing, the invention provides a device and method of optical fiber condition monitoring in optical networks that can avoid limitations from the OTDR properties and physics. It can be used in optical networks with branches to distinguish the optical fiber condition in individual branches, solving existing problems in the prior art.

Therefore, the invention discloses a monitoring device in an optical network. The optical network has one or more branches of optical fibers connecting to a terminal apparatus of the optical network. The monitoring device contains one or more optical filters and one tunable OTDR. These optical filters are installed at the front end of the branches, and each optical filter can filter optical signals of different wavelengths. The tunable OTDR is connected in front of the cross points of the optical fiber branches for outputting the optical signals corresponding to all optical filter wavelengths to all the branches. It is used to receive the optical signals reflected by the batches of all branches for analyzing the conditions of the batches of optical signals.

Besides, the invention also discloses a monitoring method in an optical network with one or more branches of optical fibers coupled to the terminal apparatus of the optical network. The method includes the steps of: installing a plurality of optical filters at the front ends of the branches to filter optical signals of different wavelengths; inputting optical signals of different wavelengths to the branches for them to be filtered by different optical filters; receiving in sequence the optical signals of different wavelengths reflected from all of the branches; and analyzing the reflected optical signals to determine the conditions of all the branches.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The disclosed monitoring method in an optical network is primarily applied in an optical network with multiple branches of optical fibers, such as a PON. The optical network can further include an optical network terminal apparatus with an optical line terminal (OLT) and several optical network terminals (ONT's). The OLT is coupled to the ONT's through an optical fiber with multiple branches. Optical filters that can filter beams of different wavelengths are installed at the front ends of the branches. The optical signal of each wavelength is input to the corresponding branch so that the signal is filtered by a distinct optical filter. The optical signal reflected each of the branches is received in sequence. The reflected optical signals are analyzed to determine the condition on each of the branches.

Figure 3:
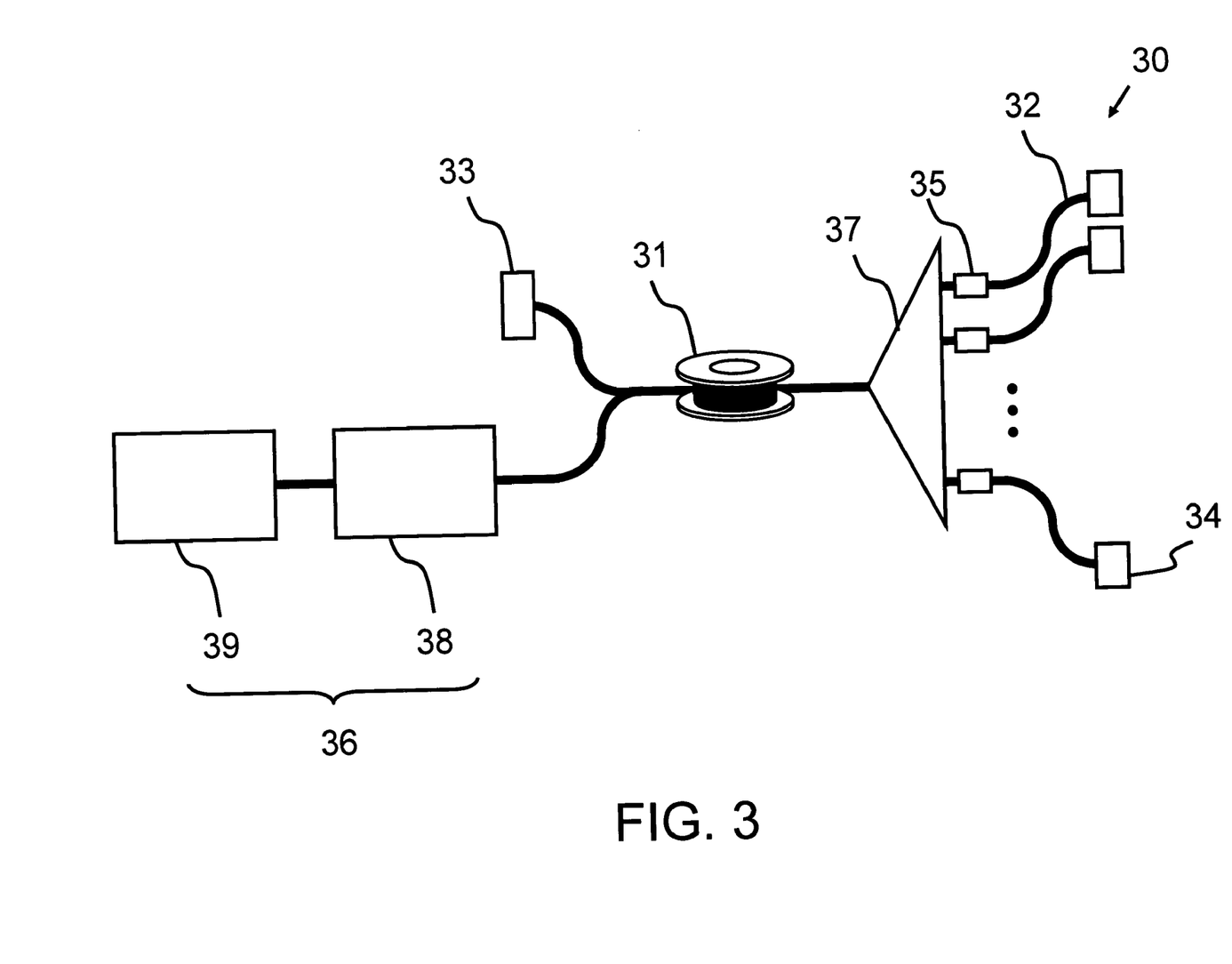
FIG. 3 is a schematic view of the monitoring device in an optical network according to the first embodiment.

With reference to FIG. 3, a monitoring device in an optical network is described to be used in an optical network 30 with a fiber 31 having multiple branches 32. The optical network 30 has an optical network terminal apparatus with an OLT 33 and several ONT's 34. The OLT 33 is coupled via the fiber 31 with multiple branches 32 to each of the ONT's 34. The monitoring device in an optical network has several optical filters 35 and a tunable OTDR 36. Each of the optical filters 35 can filter an optical signal with a distinct wavelength. A splitter 37 is installed before each of the branches 32 to split the optical signal into the branches 32. The optical filter 35 is installed after the splitter 37, i.e., before each of the branches of the optical network 30. The tunable OTDR 36 is coupled before the intersection of each of the branches 32 on the fiber 31 to output in sequence optical signals of different wavelengths to the branches 32. The optical signals reflected by the above-mentioned branches 32 in each batch are received for analysis and determining the condition of each branch. The tunable OTDR 36 can be implemented by using a tunable laser source in an OTDR, or the combination of a tunable optical filter 38 and an OTDR 39. The tunable optical filter 38 is installed on the output terminal of the OTDR 39. The tunable optical filter 38 adjusts the wavelength of the output optical signal, so that the wavelength of the optical signal output by the OTDR 39 is compliant with the wavelength that can be filtered by the optical filter 35. The optical filter 35 then prevents the optical signal with the corresponding wavelength output by the OTDR 39 from passing through.

In the disclosed monitoring device in an optical network, optical filters 35 for filtering different wavelengths of light can be added on different branches 32. The band that can be filtered by each of the optical filters 35 is within the output optical signal of the OTDR 39. Since the optical signals output from the OTDR 39 form a broadband light source, the current embodiment utilizes narrower tunable optical filters 38 and multiple optical filters 35. The tunable optical filters 38 are adjusted so that the wavelengths of the optical signals output from the OTDR 39 correspond to those that can be filtered by the optical filters 35 on the branches 32. In this case, the optical signal of the OTDR 39 cannot pass through the branch 32 with the optical filter 35 for the corresponding wavelength. But it can pass through other branches with optical filters 35 for different wavelengths.

If one uses a tunable OTDR 36 with a tunable laser source to implement the disclosed method, the wavelength of the optical signal output from the tunable OTDR 36 is adjusted to correspond to an optical filter 35 on a branch 32. In this case, the optical signal from the OTDR 39 cannot pass through the branch with the optical filter for the corresponding wavelength, whereas it can pass through other branches with optical filters 35 for different wavelengths.

Figure 4A:
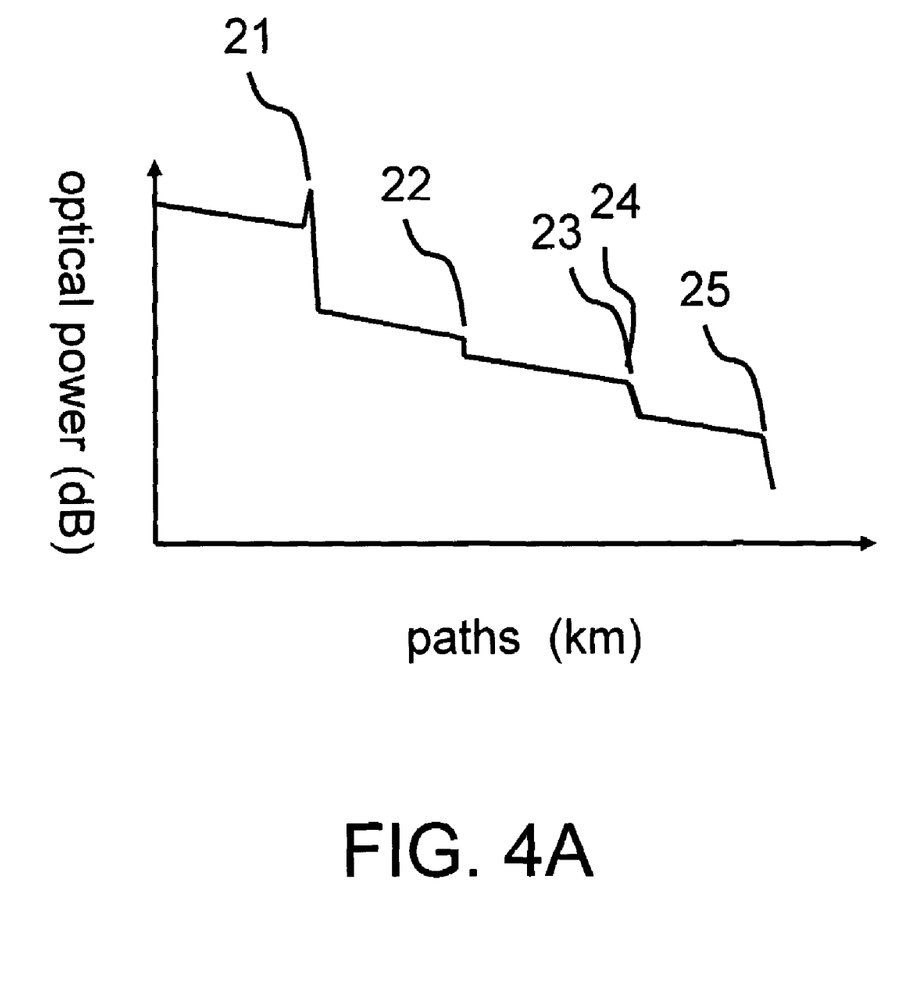
FIG. 4A shows the optical power curve of the optical signal received by the OTDR under normal conditions according to the first embodiment.
Figure 4B:
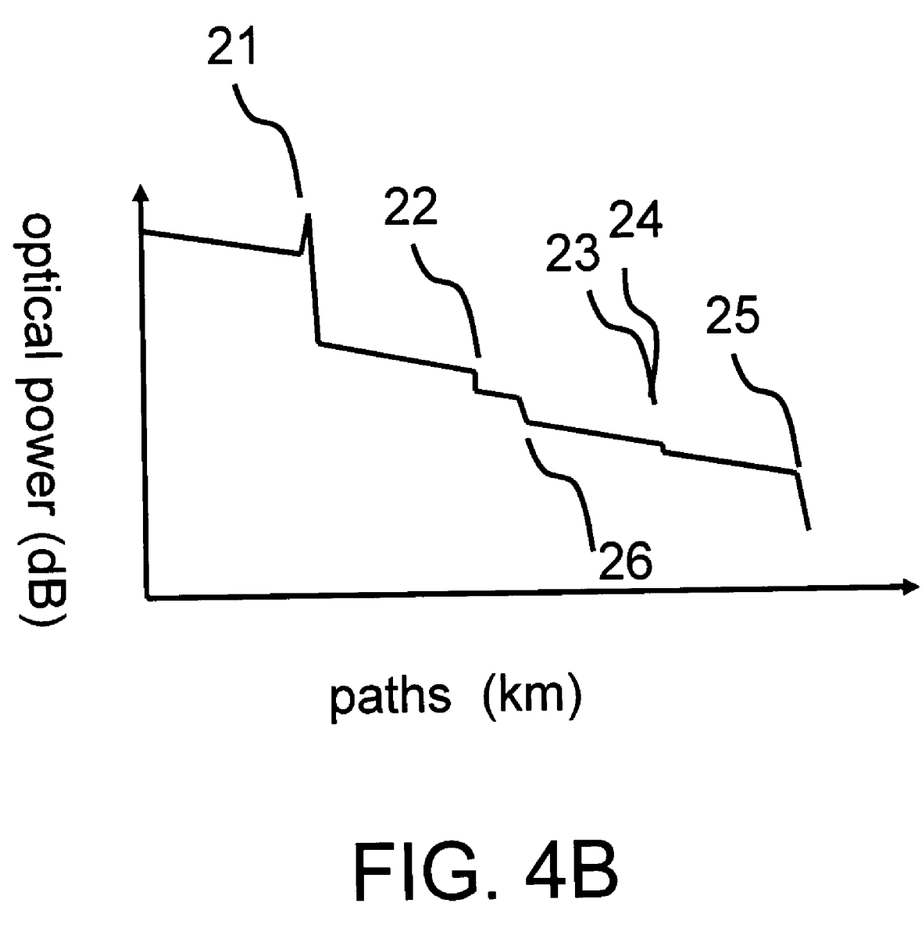
FIG. 4B shows the optical power curve of the optical signal received by the OTDR when an event occurs, where the tunable optical filter is used to adjust the wavelength of the optical signal output by the OTDR to correspond to the wavelengths of paths A, C, and D.
Figure 4C:
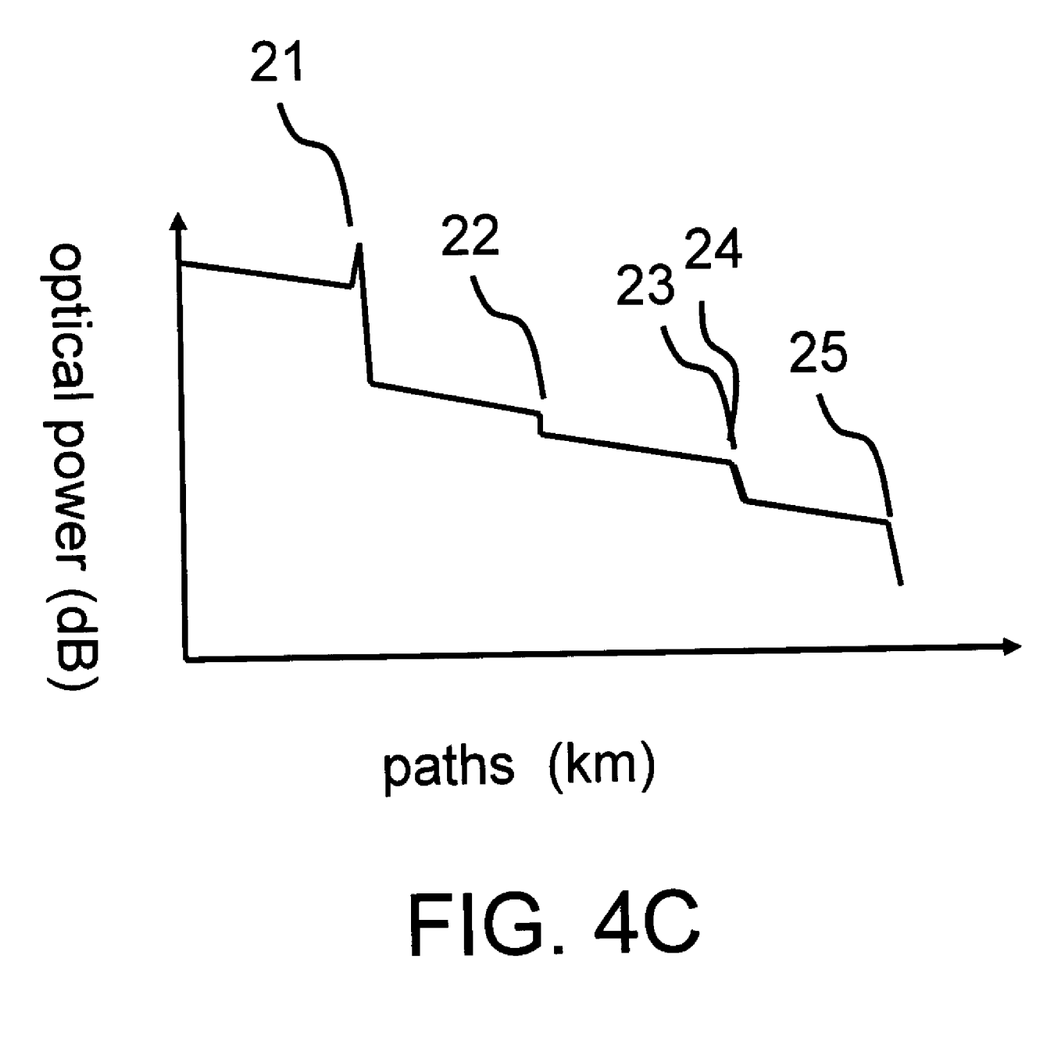
FIG. 4C shows the optical power curve of the optical signal received by the OTDR when an event occurs, where the tunable optical filter is used to adjust the wavelength of the optical signal output by the OTDR to correspond to the corresponding wavelength of path B.

For example, in a one-to-four PON, paths A, B, C, and D have optical filters for optical signals of wavelengths 1610 nm, 1615 nm, 1620, and 1625 nm. Here, the lengths of paths B and C are close to each other. As shown in FIG. 4A, it is the measured optical power curve for the optical signal received by the OTDR under normal conditions (i.e., the track of the OTDR). It is seen in the drawing that how the curve is modified by a splitter and the terminals of paths A, B, C, and D. They are respectively paths 21, 22, 23, 24, and 25. When the tunable optical filter is adjusted to 1615 nm, the optical signal emitted by the OTDR cannot pass through path B, but can pass through paths A, C, and D, as illustrated in FIGS. 4B and 4C. They show the measured optical power curves for the optical signal received by the OTDR when an event occurs. Suppose an event occurs on path B, it is not shown on the OTDR. When the wavelength of the optical signal is adjusted by the tunable OTDR to correspond to the wavelengths 1610 nm, 1620, and 1625 nm of paths A, C, and D, the optical signal can pass through path B. The OTDR shows the event occurrence and its location 26 (as shown in FIG. 4B). When the tunable optical filter adjusts the wavelength of the optical signal on path B, the OTDR does not show any anomaly (as in FIG. 4C). It can then be analyzed to find out the problem on path B.

Figure 5:
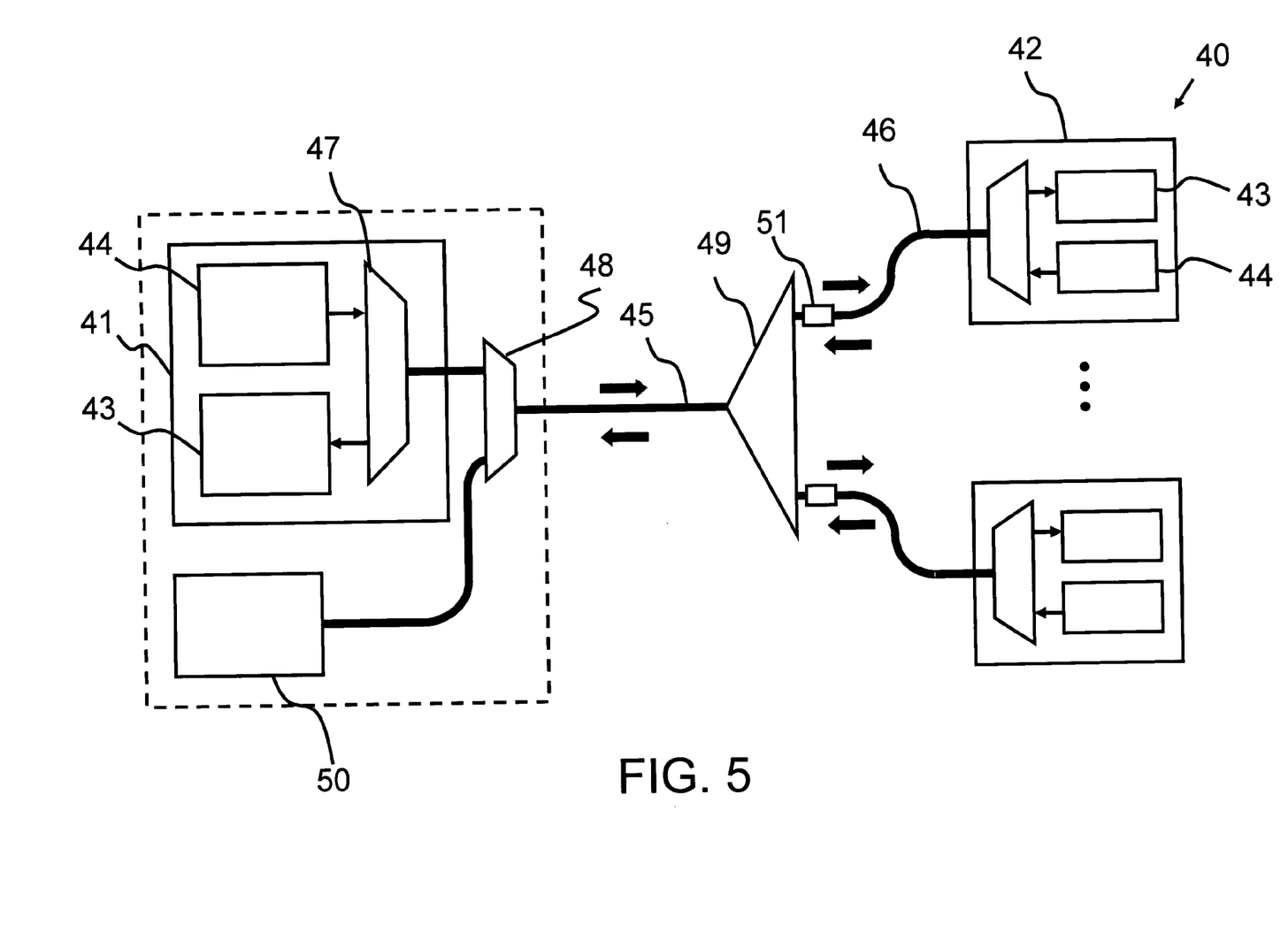
FIG. 5 is a schematic view of the monitoring device in an optical network according to the second embodiment.

As shown in FIG. 5, the monitoring device in an optical network as disclosed in a second embodiment of the invention can be used for on-line monitoring in a PON. In the optical network 40 of a PON, the OLT 41 and the several ONT's 42 are installed with optical receiving units 43 and optical transmitting units 44 for the transmission and reception of optical signals. A plane waveguide 47 is installed inside the OLT 41 and the ONT's 42 to process the optical signals received and transmitted by the optical receiving units 43 and optical transmitting units 44. A wavelength division multiplexing (WDM) coupler 48 is used before the branches 46 of the optical fiber 45. The optical fiber 45 is used to couple the OLT 41 and the tunable OTDR 50, guiding optical signals with different spectrum composition into the branches 46. This embodiment also has several optical filters 51 installed before the branches 46, i.e., after the splitter 49. Since this optical network 40 uses optical signals of the wavelengths 1.3 μm, 1.49 μm, and 1.5 μm, the current embodiment suggests using the optical signal from a tunable OTDR 50 of the wavelength 1.6 μm. Therefore, on-line monitoring is possible at the same time when the optical network 40 is used for data transmissions.

Figure 6:
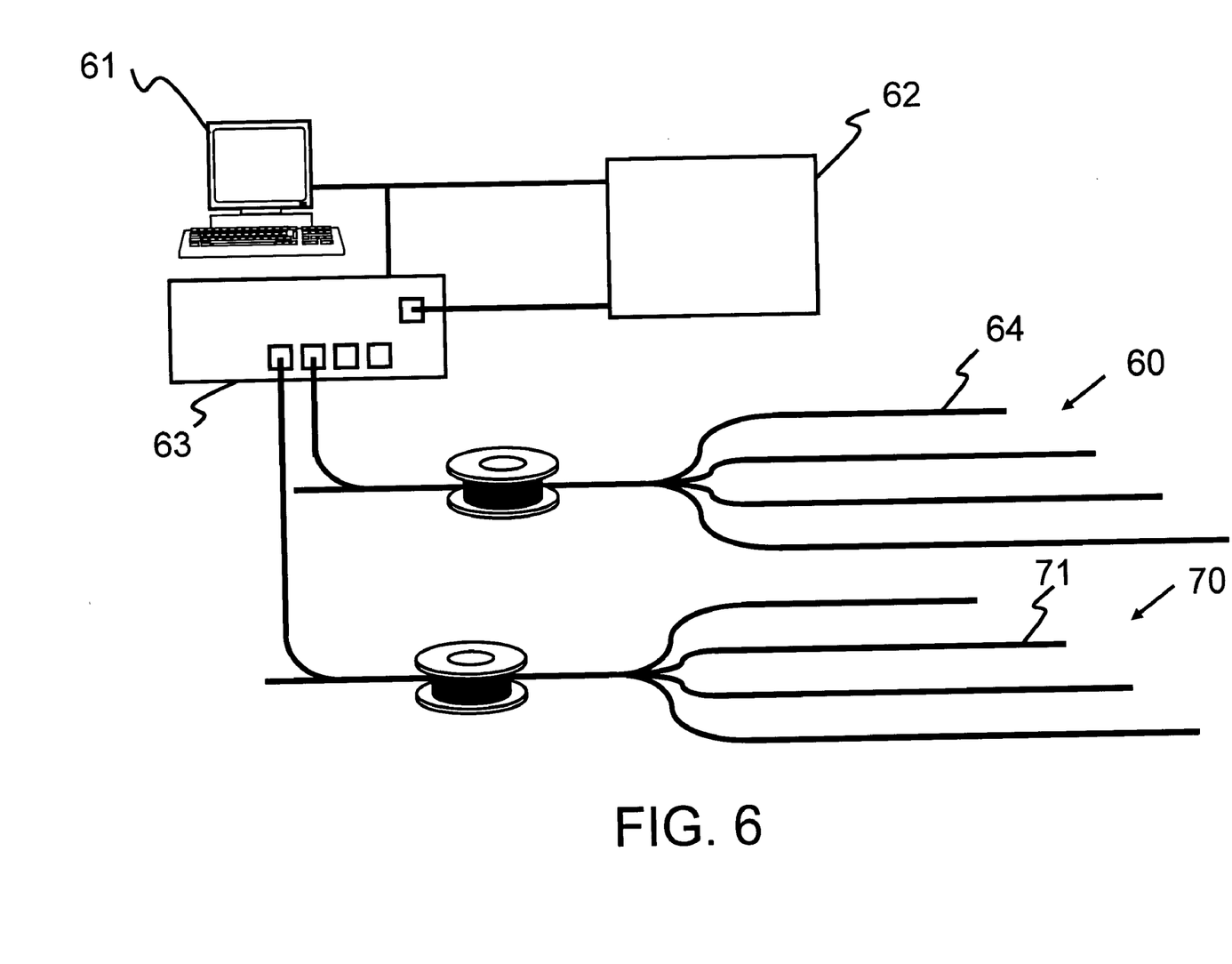
FIG. 6 is a schematic view of the monitoring device in an optical network according to the third embodiment.

FIG. 6 shows a third embodiment of the invention. The monitoring device in an optical network is used to monitor multiple PON's simultaneously. A computer 61 is used to control an optical switch 63 to automatically switch among different monitoring paths. The tunable OTDR 62 is used to monitor the fiber conditions in the optical network 60 or 70. Likewise, one can couple a plurality of sets of optical networks. Through the switch of the monitoring path, a single monitoring device is sufficient to monitor the conditions on the branches 64 or 71. This increases the efficiency of the monitoring device.

In summary, the disclosed monitoring device and method in an optical network can accurately detect the conditions on different branches in an optical network with multiple branches. The invention also solves the problem that when the lengths of more than two branches are close to one another, the conventional method cannot determine in which branch an even is occurring. The invention can perform monitoring over a non-on-line optical network. One may also develop the fiber condition monitoring technique in an on-line optical network. Even the fiber condition monitoring system for multiple optical networks is possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A monitoring device in an optical network that has an optical fiber with a plurality of branches coupling to an optical network terminal apparatus, the monitoring device comprising:
    an optical receiving unit and an optical transmitting unit installed in the optical network terminal apparatus to respectively receive and transmit an optical signal;
    a plane waveguide installed before the branches to process the optical signals received and transmitted by the optical receiving unit and the optical transmitting unit;
    a plurality of optical filters installed before the branches, each of the optical filters filtering an optical signal with a distinct wavelength; and
    a tunable optical time-domain reflectometry (OTDR) coupled before the intersection of the branches to output optical signals of wavelengths corresponding to the branches and to receive optical signals reflected by the branches in batches for analyzing the optical signals and determining the conditions of the branches.

2. The monitoring device in an optical network of claim 1, wherein the tunable OTDR includes a tunable optical filter and an OTDR, with the OTDR being used to output the optical signal and the tunable optical filter being installed after the OTDR for adjusting the wavelength of the optical signal.

3. The monitoring device in an optical network of claim 1 further comprising a beam splitter installed before the branches to split the optical signal into the branches.

4. The monitoring device in an optical network of claim 1 further comprising an optical coupler to couple the optical network terminal apparatus and the tunable OTDR to the optical fiber.

5. The monitoring device in an optical network of claim 4, wherein the optical coupler is a wavelength division multiplexing (WDM) coupler.

6. The monitoring device in an optical network of claim 1, wherein the optical network terminal apparatus has an optical line terminal (OLT) and at least on optical network terminal (ONT).

7. The monitoring device in an optical network of claim 1, wherein the tunable OTDR has a tunable laser source.

8. The monitoring device in an optical network of claim 1 further comprising an optical switch, and a computer is used to control an optical switch to automatically switch among different monitoring paths, thereby, the monitoring device in an optical network is used to monitor multiple PON's simultaneously.

9. A monitoring method in an optical network that has a fiber with a plurality of branches coupling to an optical network terminal apparatus, the method comprising the steps of:
    installing a plurality of optical filters before the branches to filter optical signals of distinct wavelengths;
    inputting in sequence optical signals of different wavelengths through an optical time domain reflectometry (OTDR) to the branches for the optical signals to be filtered by the optical filters, respectively;
    receiving in sequence the optical signals of different wavelengths reflected by the branches;
    analyzing the reflected optical signals to monitor the conditions of the branckes; and
    outputting a result after analyzing the reflected optical signals.

10. The monitoring method in an optical network of claim 9, wherein the step of analyzing the reflected optical signals is done by comparing the optical power curves of the reflected optical signals.

11. The monitoring method in an optical network of claim 10, wherein when the optical power curve for the reflected optical signal of a wavelength is not damaged while those for the reflected optical signals of other wavelengths are damaged, the branch with an optical filter of the corresponding wavelength is determined to be damaged.

* * * * *